United States Patent [19]
Chen

[11] Patent Number: 6,076,132
[45] Date of Patent: Jun. 13, 2000

[54] ARBITRATION METHOD AND CIRCUIT TO INCREASE ACCESS WITHOUT INCREASING LATENCY

[75] Inventor: Jawji Chen, Fremont, Calif.

[73] Assignee: Integrated Memory Logic, Inc., Santa Clara, Calif.

[21] Appl. No.: 08/864,950

[22] Filed: May 28, 1997

[51] Int. Cl.[7] .................................................. G06F 13/14
[52] U.S. Cl. ............................................ 710/241; 710/36
[58] Field of Search .................................. 710/36, 40–45, 710/107, 111, 113–125, 240–244, 264, 265

[56] References Cited

U.S. PATENT DOCUMENTS

| | | | |
|---|---|---|---|
| 4,926,419 | 5/1990 | Whipple .................................. | 370/447 |
| 4,969,120 | 11/1990 | Azevedo et al. ........................ | 710/117 |
| 5,016,162 | 5/1991 | Epstein et al. .......................... | 710/242 |
| 5,241,632 | 8/1993 | O'Connell et al. ..................... | 710/117 |
| 5,303,382 | 4/1994 | Buch et al. .............................. | 710/244 |
| 5,450,591 | 9/1995 | Palmer .................................... | 710/113 |
| 5,471,590 | 11/1995 | Melo et al. .............................. | 710/243 |
| 5,832,278 | 11/1998 | Pham ...................................... | 710/243 |

*Primary Examiner*—Ayaz R. Sheikh
*Assistant Examiner*—Sumati Lefkowitz
*Attorney, Agent, or Firm*—Skjerven, Morrill, MacPherson, Franklin & Friel LLP; Alan H. MacPherson; Gary J. Edwards

[57] ABSTRACT

In accordance with this invention, an arbitration unit controls access to a shared device between a plurality devices. The arbitration unit grants access to the shared device so that both the maximum latency requirement and the minimum access requirement of the devices are satisfied. In one embodiment, a first device with high access requirements uses the precedence of a second device when the second device has a higher precedence than the first device and the second device does not request access to the shared device. Thus the first device can receive access to the shared device based on the precedence of the second device or the precedence of the first device. In another embodiment, the devices are circularly ordered to determine the precedence of each device. In accordance with circular arbitration, after the first device receives access to the shared device based on the precedence of the second device, the second device is assigned the lowest precedence. Furthermore, some embodiments arrange the devices in a hierarchy of different groups. A first group within a second group is treated as a single device of the second group. One implementation of the arbitration unit includes a group pointer for each group and a precedence decoder.

21 Claims, 6 Drawing Sheets

ARBITRATION METHOD AND CIRCUIT TO INCREASE ACCESS WITHOUT INCREASING LATENCY

CROSS REFERENCE TO MICROFICHE APPENDIX

Appendix A, which is a part of the present disclosure, is a microfiche appendix consisting of 1 sheet of microfiche having a total of 19 frames. Microfiche Appendix A is a listing of Verilog code for embodiments of components of this invention, which are described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to arbitrating access to a shared device, and in particular to arbitration methods and arbitration units which provide a higher access rate for critical devices in systems without increasing maximum latency for other devices.

2. Description of the Related Art

In complex systems, many devices may access a shared device. For example, in an IBM PC compatible computer system many devices, such as a modem, a sound card, a video card, and a SCSI card, may share a single ISA bus. Similarly, various devices of a system may share a common memory device. In systems with a shared device, an arbitration unit is commonly used to control access to the shared device.

FIG. 1 depicts a sample system having a shared device 120. Devices 101–109 are coupled to and share shared device 120. An arbitration unit 100 controls which of devices 101–109 can access shared device 120. Each of devices 101–109 has a request output terminal R and a grant input terminal G coupled to arbitration unit 100. Arbitration unit 100 has a corresponding request input terminal Rx and grant output terminal Gx for device x, where x is an integer representing any one of devices 101 to 109. Specifically, request output terminal R of device 101 is coupled to request input terminal R101 of arbitration unit 100. Similarly, grant input terminal G of device 101 is coupled to grant output terminal G101 of arbitration unit 100. Although the system of FIG. 1 uses nine devices, those skilled in the art will appreciate that a fixed number of devices is used for example only and that the concepts and systems shown can be easily adapted to any number of devices. Furthermore, in some systems a single physical device is treated as multiple devices in the arbitration scheme, e.g., if the single physical device can make requests of different priority and access time. Moreover, the arbitration methods described herein can be used to arbitrate software objects. For example, in a multitasking computer system, different application programs may need to access a shared resource.

When a device, for example device 101, desires to access shared device 120, device 101 drives an active state (e.g., logic high) on request output terminal R of device 101. If arbitration unit 100 decides to grant device 101 access to shared device 120, arbitration unit 100 drives an active state on grant output terminal G101, which is connected to grant input terminal G on device 101. When device 101 detects the active state on grant input terminal G of device 101, device 101 accesses shared device 120. Typically, device 101 retains access to shared device 120 until device 101 indicates that device 101 no longer requires access to shared device 120. The time between receiving a grant to access shared device 120 and relinquishing shared device 120, is called the access time. A common method for relinquishing shared device 120 is for device 101 to maintain an active state on request output terminal R until device 101 no longer requires access to shared device 120.

Arbitration unit 100 can use a variety of arbitration schemes. For example a simple arbitration scheme is to grant access to shared device 120 to the first device making a request. Since multiple devices may request access to shared device 120 simultaneously, the requests are queued so that the device with the oldest pending request is granted access to shared device 120. For example, if device 101 is using shared device 120 and device 104 asserts a request followed later by a request from device 102, arbitration unit 100 would grant device 104 access to shared device 120 after device 101 relinquishes shared device 120. After device 104 relinquishes shared device 120, arbitration unit 100 grants device 102 access to shared device 120.

Since this scheme guarantees all devices equal access to shared device 120, the latency, i.e., the time between making a request to access shared device 120 and completing the requested access to shared device 120, can be quite high. The access time, i.e., the time between receiving a grant to access shared device 120 and relinquishing shared device 120, of each device 101 through 109 varies. Therefore each device is typically limited to access shared device 120 for at most a maximum access time, i.e., the maximum time a device may retain access to shared device 120. In some systems, the maximum access time of each device is unique to that device. In such systems, the maximum latency of accessing shared device 120, i.e., an upper bound for the time between making a request to access shared device 120 and completing the requested access to shared device 120, for a particular device is the sum of the maximum access time of each device. For the simple arbitration method, the maximum latency for a particular device occurs if every other device has a pending request for shared device 120 when the particular device makes a request for shared device 120.

However, each device may have a different maximum latency requirement, i.e., an upper bound on the amount of latency a device can tolerate, for access to shared device 120. In general, high priority devices will have a lower maximum latency requirement for accessing shared device 120 and low priority devices will have a higher maximum latency requirement for accessing shared device 120. The simple arbitration scheme of granting access to shared device 120 based on the time of the request is not easily adaptable to provide different maximum latencies of accessing shared device 120 for devices 101 to 109 having different levels of priority.

FIG. 2(*a*) conceptually illustrates a hierarchical arbitration scheme which can provide different maximum latencies of accessing shared device 120 for different groups of devices. Devices 101–109 are divided into groups based on the maximum latency requirement of accessing shared device 120 for each device. In the example of FIG. 2(*a*), the devices with the highest priority, i.e., lowest maximum latency requirements, for example, device 101, device 102, and device 103 are in group 0. Devices with slightly lower priority, such as device 104, are in group 1. Group 2 contains low priority devices, such as device 105 and device 106. Finally, Group 3 is for the lowest priority devices, such as device 107, device 108, and device 109. Conceptually all of the devices in Group 3 are treated as one device in Group 2. Similarly all of the devices in Group 2 are treated as one device in Group 1 and the devices of Group 1 are treated as one device in Group 0. Each device in group X can be referred to as a group X device. For example, device 101 is a group 0 device.

When the system is powered up or reset, one device in each group begins with the highest precedence for that group. In this example, device 101, device 104, device 105, and device 107 begins with the highest precedence for group 0, group 1, group 2, and group 3, respectively. The order of precedence is assigned circularly from the device with the highest precedence in a group as illustrated by the arrows in FIG. 2(*a*). For example, when device 101 has the highest precedence in group 0, device 102 has the second highest precedence in group 0. Device 103 has the third highest precedence in group 0. Group 1, treated as a single group 0 device, has the fourth highest precedence in group 0. Conceptually, the devices are circularly ordered within the group as shown by the arrows in FIG. 2(*a*). The precedence within the group is then assigned by selecting the highest-precedence device and assigning decreasing precedence to each device of the group following the circular order of the devices within the group.

The precedence ranking within a group is reassigned after a device within the group has access to shared device 120. Specifically, if a device is granted access to shared device 120, the device with access to shared device 120 is assigned the lowest precedence in the group and is designated the lowest-precedence device within the group. Therefore, the next device in the group following the circular ordering of the group as shown by the arrows is assigned the highest precedence and is designated as the highest-precedence device in the group. The remaining devices in the group are then assigned decreasing precedence following the circular ordering of the devices in the group. For example, if device 102 has the highest precedence in group 0 but only device 103 and device 101 are requesting access to shared device 120, device 103 is granted access to shared device 120. Then group 1, treated as a single device within group 0, is assigned the highest precedence within group 0. Device 101 is assigned the second highest precedence within group 0. Device 102 is assigned the third highest precedence within group 0, and device 103 is assigned the fourth highest (i.e., the lowest) precedence in group 0. The preceding example also illustrates that even though device 102 had the highest precedence within group 0 and device 102 did not request access to shared device 120, device 102 is does not retain the highest precedence after a device is granted access to shared device 120. Precedence within group 1, group 2, and group 3 are assigned similarly.

Arbitration unit 100 (FIG. 1) grants the highest-precedence requesting device access to shared device 120. The highest-precedence requesting device is the device with the highest precedence among all devices requesting access to shared device 120. Devices within group 1 are granted access to shared device 120 only if no group 0 device with a higher precedence than group 1, treated as a single device in group 0, is requesting access to shared device 120. For example, if device 102 has the highest precedence in group 0, device 104 can be granted access to shared device 120, only if neither device 102 nor device 103 is requesting access to shared device 120. In addition, device 104 must have a higher group 1 precedence than any other device in group 1, which is also requesting access to shared device 120.

Group 2 devices are granted access to shared device 120 only if no group 0 devices having higher precedence than group 1, treated as a single device in group 0, are requesting access to shared device 120 and no group 1 devices having higher precedence than group 2, treated as a single device in group 1, are requesting access to shared device 120. Similarly, group 3 devices are granted access to shared device 120 only if no group 0 devices having higher precedence than group 1, treated as a single device in group 0, are requesting access to shared device 120; no group 1 devices having higher precedence than group 2, treated as a single device in group 1, are requesting access to shared device 120; and no group 2 devices having a higher precedence than group 3, treated as a single device in group 2, are requesting access to shared device 120. Thus each device in the arbitration scheme is assigned a unique precedence within a hierarchy of precedences.

For example, the order of precedence upon power on or reset for the arbitration scheme of FIG. 2(*a*) from highest precedence to lowest precedence is device 101, device 102, device 103, device 104, device 105, device 106, device 107, device 108, and device 109. This precedence order can be obtained by beginning at group 0 and expanding each group within another group. Beginning with group 0 the precedence order is device 101, device 102, device 103, and group 1. Expanding group 1 produces the precedence order as device 101, device 102, device 103, device 104, and group 2. Expanding group 2 produces the precedence order as device 101, device 102, device 103, device 104, device 105, device 106, and group 3. Finally, expanding group 3 produces the precedence order as device 101, device 102, device 103, device 104, device 105, device 106, device 107, device 108, and device 109.

If device 105 is given access to shared device 120, the precedence order becomes device 101, device 102, device 103, device 104, device 106, device 107, device 108, device 109, and device 105. Conceptually beginning at group 0, the precedence order is device 101, device 102, device 103, and group 1, since granting device 105 access to shared device 120 requires conceptually granting group 1, as a single group 0 device, access to shared device 120, which results in group 1 having the lowest precedence in group 0. Expanding group 1 produces the precedence order as device 101, device 102, device 103, device 104, and group 2; since granting device 105 access to shared device 120 requires conceptually granting group 2, as a single group 1 device, access to shared device 120, which results in group 2 having the lowest precedence in group 1. Expanding group 2 produces the precedence order as device 101, device 102, device 103, device 104, device 106, group 3, and device 105, since device 105 now has the lowest precedence in group 2. Expanding group 3 results in the precedence order as device 101, device 102, device 103, device 104, device 106, device 107, device 108, device 109, and device 105.

If device 102 is next granted access to shared device 120 then the order of precedence becomes device 103, device 104, device 106, device 107, device 108, device 109, device 105, device 101, and device 102. Conceptually beginning at group 0, the precedence order is device 103, group 1, device 101, device 102, since device 102 now has the lowest precedence in group 0. Expanding group 1 produces the precedence order as device 103, device 104, group 2, device 101, and device 102. Expanding group 2 produces the precedence order as device 103, device 104, device 106, group 3, device 105, device 101, device 102. Expanding group 3 results in the precedence order as device 103, device 104, device 106, device 107, device 108, device 109, device 105, device 101, and device 102.

The arbitration scheme illustrated by FIG. 2(a) can be used with any number of devices arranged within any number of groups. Therefore, maximum latency calculations within groups are generally approximated by groups. The specific maximum latency for any member of a group is less than the approximated maximum latency of the group. For a general case where Nx is the number of members in group x, and Amax is the maximum access time of any device, the maximum latency LGx of group x is as follows:

LG0=N0*Amax

LG1=N1*LG0=N1*N0*Amax

LG2=N2*LG1=N2*N1*N0*Amax, and in general

LGx=Nx*LG(x−1)=Nx*N(x−1)* . . . *N0*Amax.

The actual maximum latency of a device in group x is less than or equal to LGx.

For the specific embodiment of FIG. 2(a), the maximum latency for each device with Lxxx being the maximum latency for device xxx, Axxx being the maximum access time of device xxx, AGx being the maximum access time of any member of group x, and MAX (a,b,c)=the maximum number in the set of numbers a, b, and c, are as follows:

```
AG1 = MAX (A104, A105, A106, A107, A108, A109)
AG2 = MAX (A105, A106, A107, A108, A109)
AG3 = MAX (A107, A108, A109)
L101 = A102 + A103 + AG1 + A101
L102 = A103 + AG1 + A101 + A102
L103 = AG1 + A101 + A102 + A103
L104 = A101 + A102 + A103 + AG2 + A101 + A102 +
       A103 + A104
L105 = A101 + A102 + A103 + A104 + A101 + A102 +
       A103 + A106 + A101 + A102 + A103 + A104 +
       A101 + A102 + A103 + AG3 + A101 + A102 +
       A103 + A104 + A101 + A102 + A103 + A105 +
L106 = A101 + A102 + A103 + A104 + A101 + A102 +
       A103 + AG3 + A101 + A102 + A103 + A104 +
       A101 + A102 + A103 + A105 + A101 + A102 +
       A103 + A104 + A101 + A102 + A103 + A106 +
L107 = A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A108 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A109 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A107 +
L108 = A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A109 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A107 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A108 +
L109 = A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A107 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A108 +
       A101 + A102 + A103 + A104 + A101 + A102 +
       A103 + A105 + A101 + A102 + A103 + A104 +
       A101 + A102 + A103 + A106 + A101 + A102 +
       A103 + A104 + A101 + A102 + A103 + A109
```

Thus the latency of the various devices is dependent on the maximum access time of the devices. Therefore, most systems dictate maximum acess times for the devices to control the maximum latency. However, some devices require higher access time or a greater number of accesses to shared device 120 than can be allotted while satisfying the maximum latency requirements of the other devices.

FIG. 2(b) conceptually illustrates a method to increase access to shared device 120 for device 102. In FIG. 2(b), group 3 of FIG. 2(a) is modified to also include device 102. Thus device 102 can be granted access to shared device 120 based on precedence in group 0 or precedence in group 3. However, by adding device 102 into group 3, the maximum latency of accessing shared device 120 for device 107, device, 108 and device 109 is increased by approximately 33%. Furthermore, since group 3 devices are so rarely granted access to shared device 120, device 102's access to shared device 120 does not increase by a significant amount.

To provide greater access for device 102, device 102 can be placed in either group 2, group 1, or again in group 0. However, the maximum latency of accessing shared device 120 will be significantly increased for the other devices. For example if device 102 is added to group 2, the maximum latency of accessing shared device 120 for group 2 devices is increased approximately 33%. In addition the maximum latency of accessing shared device 120 for group 3 devices is also increased by 33%. Hence there is a need for a method or apparatus to arbitrate access to a shared device between a plurality of devices that can satisfy both the maximum latency requirements of various devices and the minimum access requirements of the devices.

SUMMARY OF THE INVENTION

In accordance with this invention, an arbitration unit controls access to a shared device among a plurality devices. The arbitration unit grants access to the shared device so that both the maximum latency requirement and the minimum access requirement of the devices are satisfied. The arbitration unit assigns a precedence to each device and monitors requests for access to the shared device from the devices. The arbitration unit then grants the highest-precedence requesting device, i.e., the device with the highest precedence actually making a request, access to the shared device.

An arbitration unit in accordance with a first embodiment of the present invention uses the precedence of a first device in place of the precedence of a second device if the first device is not requesting access to the shared device and the precedence of the first device is greater than the precedence of the second device. Generally, the devices are circularly ordered by precedence to form a hierarchy of precedences. After the highest-precedence requesting device is granted access to shared device 120, the arbitration unit designates the highest-precedence requesting device as the lowest-precedence device by assigning the lowest precedence to the highest-precedence requesting device unless the highest-precedence requesting device is the second device and the precedence of the first device is greater than the precedence of the second device. If the highest-precedence requesting device is the second device and the precedence of the first device is greater than the precedence of the second device, the arbitration unit designates the lowest precedence device by assigning the lowest precedence to the first device.

An arbitration unit in accordance with a second embodiment of the present invention includes a cluster as a member of a first group of devices. The cluster includes a primary device and a secondary device. The arbitration unit assigns a precedence to each member of the first group including the cluster and detects requests to access the shared device from the first group of devices. The arbitration unit determines the first-group highest-precedence requesting device, i.e., the member of the first group with the highest precedence actually requesting access to the shared device 120. The arbitration unit uses the precedence of the cluster for the primary device if the primary device requests access to the shared device. If the primary device does not request access to the shared device, the arbitration unit uses the precedence of the cluster for the secondary device.

An arbitration unit in accordance with a third embodiment of the present invention detects an incomplete access caused by a limitation of the shared device. The arbitration unit maintains the precedence hierarchy of the devices if an incomplete access caused by the limitation of the shared device is detected. Otherwise, the arbitration unit reassigns the precedences of the devices to form a new hierarchy of precedences.

Arbitration units in accordance with embodiments of the present invention can be formed using a group pointer for each group of devices and a precedence decoder. Each group pointer is configured to indicate the group-highest-precedence requesting device ID within each group. One embodiment of a group pointer includes a modulo counter and a request detector. The precedence decoder is configured to generate a grant signal to the highest-precedence requesting device.

BRIEF DESCRIPTION OF THE DRAWINGS

FIG. 2(*b*) shows a conceptual diagram of a group for an alternative arbitration scheme.

FIG. 3(*b*) shows a conceptual diagram of a group for an arbitration scheme in accordance with a second embodiment of the invention.

FIG. 4(*b*) shows a conceptual diagram of a group for an arbitration scheme in accordance with a fourth embodiment of the invention.

DETAILED DESCRIPTION

Figure 1:
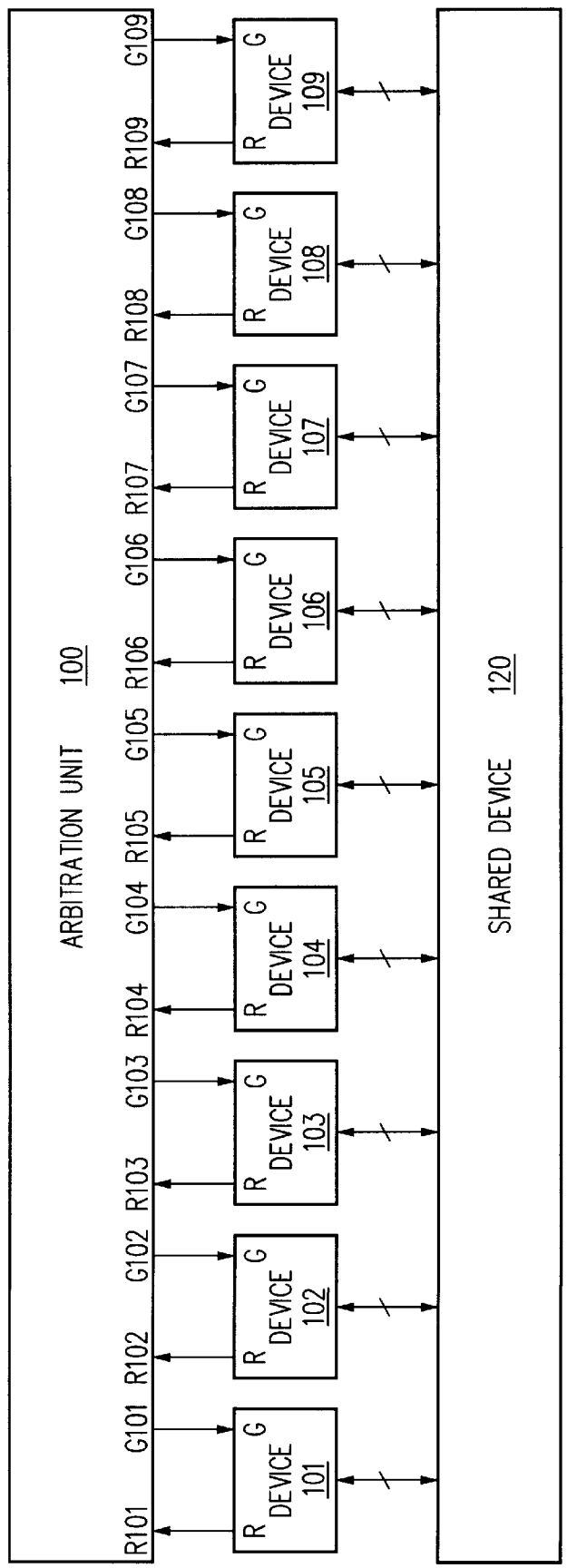
FIG. 1 shows a system using an arbitration unit to control access by a plurality of devices to a shared device.

According to the principles of this invention, certain limitations imposed by conventional arbitration schemes have been overcome. The present invention provides an arbitration scheme and an arbitration unit to control access by a plurality of devices to a shared device. The arbitration unit is able to satisfy both the maximum latency and minimum access requirements of the devices. For example, in one embodiment of the invention, an arbitration unit in a device controller for an IDE/ATAPI CD-ROM drive controls access to a memory buffer by a host computer system, an error correcting circuit, a microcontroller, a digital to analog converter, refresh circuitry, and, digital signal processor, which stores and retrieves primary data, secondary error correction data, general subcode data, subcode channel Q data, and serial digital audio data.

FIG. 3(*a*) shows a conceptual model of an arbitration scheme which modifies group 0 of FIG. 2(*a*) to allow device 102 more access to shared device 120 without significantly increasing the maximum latency of accessing shared device 120 for the other devices. Specifically, for the embodiment of FIG. 3(*a*), device 102, in addition to being a group 0 device, is conceptually combined with device 103 to form cluster 310. Like a group, a cluster is treated as a single device in the group to which the cluster belongs. However, in a cluster a primary device or primary group is always given the highest precedence within the cluster. Secondary devices in the cluster are assigned lower precedences. For example, in the specific embodiment illustrated in FIG. 3(*a*), the primary device is device 103, which always has precedence over the secondary device, i.e., device 102, in cluster 310.

The cluster's precedence is typically the precedence that the primary device of the cluster would have received. For example, in FIG. 3(*a*) the precedence of cluster 310 is the precedence that device 103 should have received. A cluster can also be added to a group without replacing an existing group device. In these cases, the cluster is assigned a precedence as if the cluster were a single group device.

Secondary devices in a cluster are granted access to shared device 120 only when no other device in the group with higher precedence than the cluster is requesting access to shared device 120 and the primary device in the cluster is not requesting access to shared device 120. Thus, device 102 is given a first precedence as a group 0 device and a second precedence as a secondary device in cluster 310. Device 102 is granted access to shared device 120 based on the second precedence of device 102 only when no group 1 device with higher precedence than cluster 310 is requesting access to shared device 120 and device 103, the primary device of cluster 310, is not requesting access to shared device 120. In other words, if device 103 is not requesting access to shared device 120, then the precedence of device 102 in terms of accessing shared device 120 is the higher of the first precedence given directly to device 102 as a group 0 device or the precedence of device 103 which was assigned to cluster 310, i.e., the second precedence of device 102. However, after device 102 is granted access to shared device 120, the actual precedence used by device 102 controls the redefinition of the precedence of group 0 devices. Specifically, after device 102 is granted access to shared device 120, if the first precedence of device 102 is greater than the second precedence of device 102, then cluster 310 is assigned the highest precedence, since the precedence of device 102 as a group 0 device was used to grant device 102 access to shared device 120. However, if the second precedence of device 102 is greater than the first precedence of device 102, group 1 is assigned the highest precedence within group 0, since the precedence of cluster 310 was used to grant device 102 access to shared device 120.

Figure 3A:
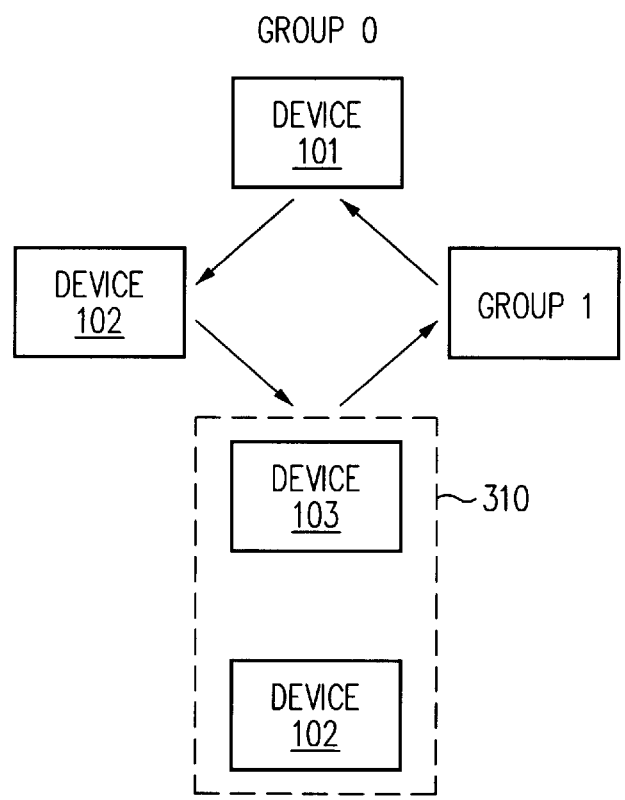
FIG. 3(*a*) shows a conceptual diagram of a group for an arbitration scheme in accordance with one embodiment of the invention.

The maximum latency of accessing shared device 120 for devices outside of cluster 310, is increased only if the maximum access time of device 102 is greater than the maximum access time of device 103. However, the maximum latency of accessing shared device 120 for device 103 is increased by the maximum access time of device 102, since device 103 may make a request the instant after device 102 is granted access to shared device 120 based on the precedence established by cluster 310. Thus the maximum latency of device 103 (L103) for FIG. 3(a) is A102+AG1+ A101+A102+A103.

Figure 2A:
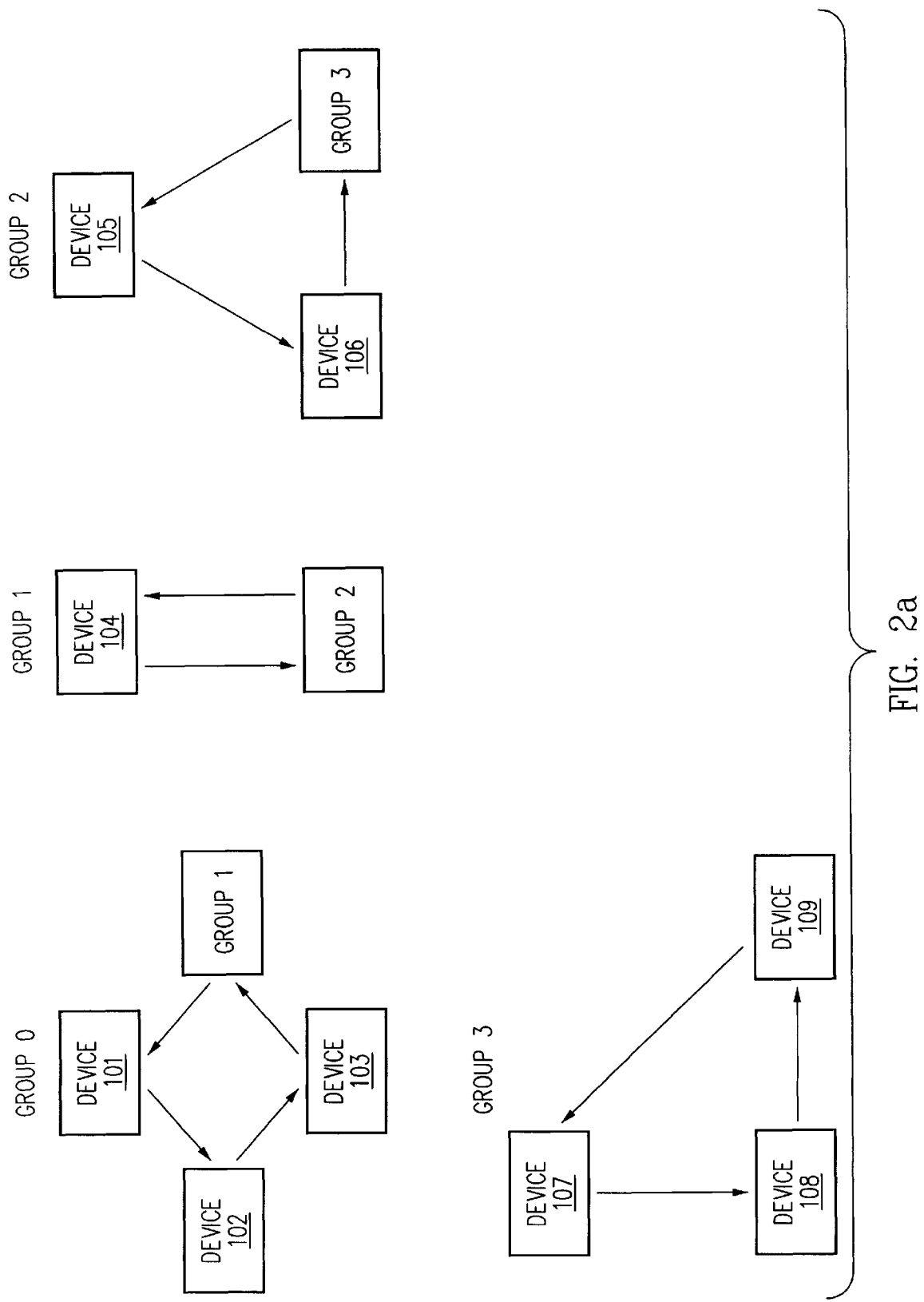
FIG. 2(*a*) shows a conceptual diagram of an arbitration scheme.
Figure 3B:
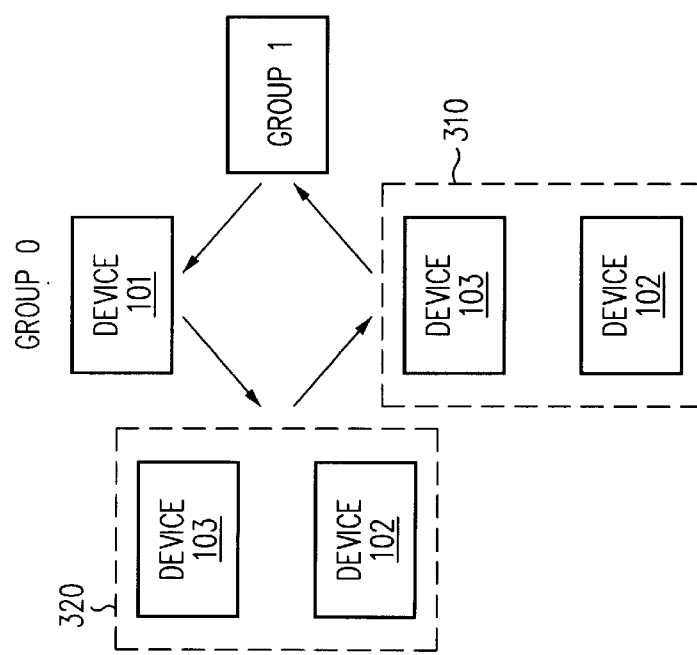

FIG. 3(b) shows a conceptual model of another arbitration scheme which modifies group 0 of FIG. 2(a) to allow device 102 more access to shared device 120. The embodiment of FIG. 3(b) can be used when device 103 makes infrequent and nonconsecutive requests for shared device 120. Specifically, for the embodiment of FIG. 3(b), device 102 is conceptually combined with device 103 to form cluster 310 and a cluster 320. Cluster 320 receives the precedence that device 102 had in group 0 of FIG. 2(a) or FIG. 3(a). Cluster 310 receives the precedence that device 103 had in group 0 of FIG. 2(a). In both cluster 310 and cluster 320, device 103 is the primary device so device 103 always has precedence over device 102, which is the secondary device. Device 102 is given a first precedence based on the precedence of cluster 320 and a second precedence based on the precedence of cluster 310. Device 102 is granted access to shared device 120 based on the second precedence of device 102 only when no group 0 device with higher precedence than cluster 310 is requesting access to shared device 120 and device 103 is not requesting access to shared device 120. Similarly, device 102 is granted access to shared device 120 based on the first precedence of device 102 only when no group 0 device with higher precedence than cluster 320 is requesting access to shared device 120 and device 103 is not requesting access to shared device 120.

The arbitration scheme of FIG. 3(b) increases the maximum latency of accessing shared device 120 for the devices of the system, except for device 102 and device 103, only if the maximum access time of device 102 is greater than the maximum access time of device 103. Specifically, if the maximum access time of device 102 is greater than the maximum access time of device 103 the maximum latency of the devices of the system, except for device 102 and device 103 increases by two times the difference between the maximum access time of device 102 and the maximum access time of device 103, i.e., 2*(A102−A103 ). The maximum latency for device 103 for FIG. 3(b) occurs when device 103 requests access to shared device 120 just after device 102 is granted access to shared device 120 due to the precedence of cluster 310. In this situation, the maximum latency for device 103 (L103 ) is A102+AG1+A101+A103. Thus, the maximum latency of device 103 for FIG. 3(b) is equal to the maximum latency of device 103 for FIG. 2(a).

If no limits are set on the requests of device 103, the maximum latency of device 102 in FIG. 3(b) is infinite because device 103 always has precedence over device 102. Therefore, if device 103 always request access to shared device 120, device 120 is never granted access to shared device 120. However, if device 103 is precluded from making a rearrest for shared device 120 right after device 103 is finished accessing shared device 120, the maximum latency of device 102 (L102) in FIG. 3(b) is A103+AG1+ A101+A103+A102. Thus, the maximum latency of device 102 in FIG. 3(b) is greater than the maximum latency of device 102 in FIG. 2(a). However, if device 103 requests access to shared device 120 infrequently, the actual latency of device 102 is typically not greater than A103+AG1+ A101+A102. Thus by using the cluster 320 and 310 in group 0 as shown in FIG. 3(b), device 102 is granted access to shared device 120 more often than device 102 would receive access in group 0 of FIG. 2(a) without significantly increasing the maximum latency of any other device. Moreover, if the average access time of device 102 is less than the average access time of device 103, the actual latency of the other devices may be decreased while granting device 102 a greater number of accesses to shared device 120.

Figure 4A:
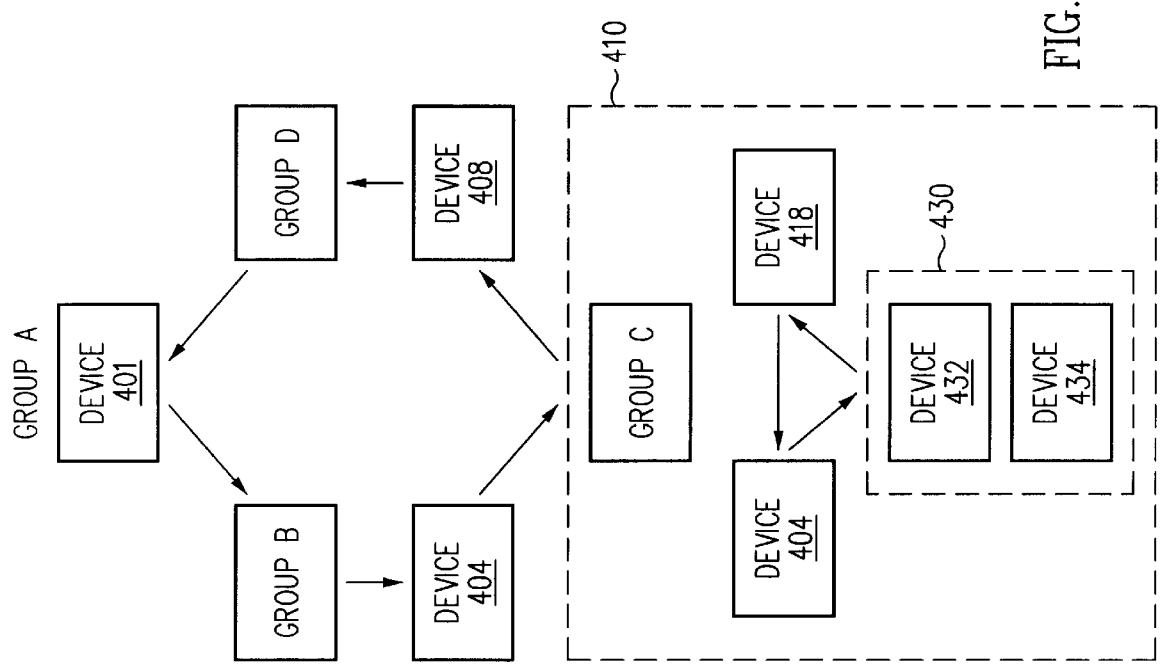
FIG. 4(*a*) shows a conceptual diagram of a group for an arbitration scheme in accordance with a third embodiment of the invention.

FIG. 4(a) conceptually illustrates a more general embodiment of one group within an arbitration scheme in accordance with the invention. Group A which can be a subgroup within another group or the top group of the arbitration scheme, contains device 401, group B, device 404, cluster 410, device 408, and group D. Group B, group D, and cluster 410 are each treated as a single device within group A. Therefore, group B, group D, and cluster 410 each receives a precedence in group A. Cluster 410 contains group C as the primary device of cluster 410 as well as three secondary devices, device 404, cluster 430, and device 418. Cluster 430 contains device 432 as the primary device of cluster 430 as well as device 434 as the secondary device. The precedence of cluster 410 is assigned circularly in group A like any other group A device. Since device 404 is also a device in group A, device 404 is able to access shared device 120 more frequently than other devices which are in group A exclusively. Device 418, device 432, and device 434 may appear elsewhere in the arbitration scheme or exclusively in cluster 410. Within a cluster, any arbitration scheme can be used to prioritize the requests of the secondary devices. In one embodiment circular precedence assignment, as described above, is used; so that device 404, cluster 430, and device 418, can be treated as a group of devices.

If group C were originally a group A device, the maximum latency of accessing shared device 120 for devices outside of cluster 410 is increased by MAX(AGC, A404, A418, A432, A434)−AGC, i.e., the greater of the access time of the longest access time of any device in group c, device 404, device 418, device 432, or device 434 minus the longest access time of any device in group C. The maximum latency of accessing shared device 120 by group C is increased by the greater of the access time of device 404, device 41, device 432, or device 434. Thus, device 404, device 418, device 432, and device 434 are granted greater access to shared device 120 without greatly impacting the latency of the other devices. If the access time of device 404, device 418, device 432, and device 434 is less than the greatest access time of any group C device, the maximum latency of accessing shared device 120 for non group C devices is not increased. Thus one skilled in the art can create an arbitration scheme using the principles of the invention to cluster and group various devices to satisfy both the minimum access and maximum latency requirements of the devices.

Clusters can also be used to limit the number of accesses granted to a device which requests accesses more often than is really necessary. For example in group 0 of FIG. 2(a), both device 101 and device 102 may constantly request access to shared device 120. If device 103 and group 1, as a single group 0 device, only request access infrequently, device 101 and device 102 each receive almost half of the total number of grants. However, in some situations the overall system would benefit if device 102 receives more grants than device 101. By replacing device 103 with cluster 310 as shown in FIG. 3(a), device 102 receives approximately twice as many grants as compared to device 101. Thus, device 101 is prevented from receiving an unnecessarily large number of grants to access shared device 120.

Figure 4B:
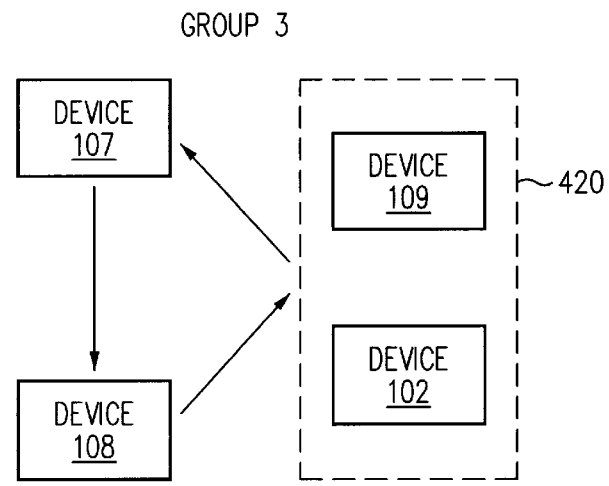

The technique of using a cluster to regulate unnecessary access to shared device 120 can also be implemented by using a cluster within a subgroup. For example, FIG. 4(b) shows an alternative group 3 which can replace group 3 in FIG. 2(a). In FIG. 4(b), device 109 is replaced with a cluster 420 containing device 109 and device 102. Cluster 420 receives the precedence that device 109 would have received. Device 109 is the primary device of cluster 420 so that device 109 always has precedence over device 102 in cluster 420. If group 3 of FIG. 4(b) is used in place of Group 3 of FIG. 2(a) and devices in only group 1 (i.e., device 104, device 105, device 106, device 107, device 108, and device 109) make infrequent requests for shared device 120, device 102 in group 0 and group 3 can receive twice as many grants to access shared device 120 as device 101. Thus, if device 101 makes unnecessary requests, device 101 is limited to receive a maximum of one third of the grants to access shared device 120. By using group 0 of FIG. 3(a) in place of group 0 of FIG. 2(a) and group 2 of FIG. 4(b) in place of group 2 of FIG. 2(a) and if device 102 always requests access to shared device 120, device 101 can be limited to only one-fourth of the grants to access shared device 120.

Some embodiments of shared device 120 may have limitations which prevent an accessing device from completing the desired access with shared device 120. For example, if shared device 120 is a fast page mode DRAM buffer, attempts to read or write data crossing a page boundary, i.e., the data do not all share the same row address, may take longer than the maximum access time allotted to the accessing device. In one embodiment, device 101 is configured to read a fixed number N bytes of data from shared device 120 so that device 101 does not exceed a maximum access time limitation on a single request. Since the desired bytes of data typically exist on one page, i.e., the data have the same row address, of the fast page mode DRAM buffer embodiment of shared device 120, N is set to be the maximum number of bytes which can be accessed from one page of shared device 120 without violating the maximum access time limitation. However, if device 101 attempts to read data spanning a page boundary of shared device 120, two RAS (Read address strobe) cycles are needed. Therefore, the desired access would violate the maximum access time limitation.

Typically, device 101 is configured to stop accessing at the end of the first RAS cycle and request access to shared device 120 again to complete the original request using a second RAS cycle. However, if device 101 is forced to wait until the next time device 101 has the highest precedence, the maximum latency requirement to complete the original request of device 101 may be violated. Therefore, in one embodiment of the invention arbitration unit 100 detects incomplete access caused by a limitation of shared device 120, and preserves the precedence assignment among the devices. Thus, the accessing device retains the highest precedence and is granted a second consecutive access so that the accessing device can complete the original request. In general, when a device's access is forced into two separate accesses, each separate access takes less time than a full normal access. Therefore, the consecutive accesses granted to the accessing device do not double maximum access time typical of that device. With appropriate margins in the satisfaction of the maximum latency requirement of the devices coupled with the likelihood that at least one device will not make a request during its highest-precedence cycle, granting two consecutive accesses to a single device should not violate the maximum latency requirement of any other device.

Figure 5:
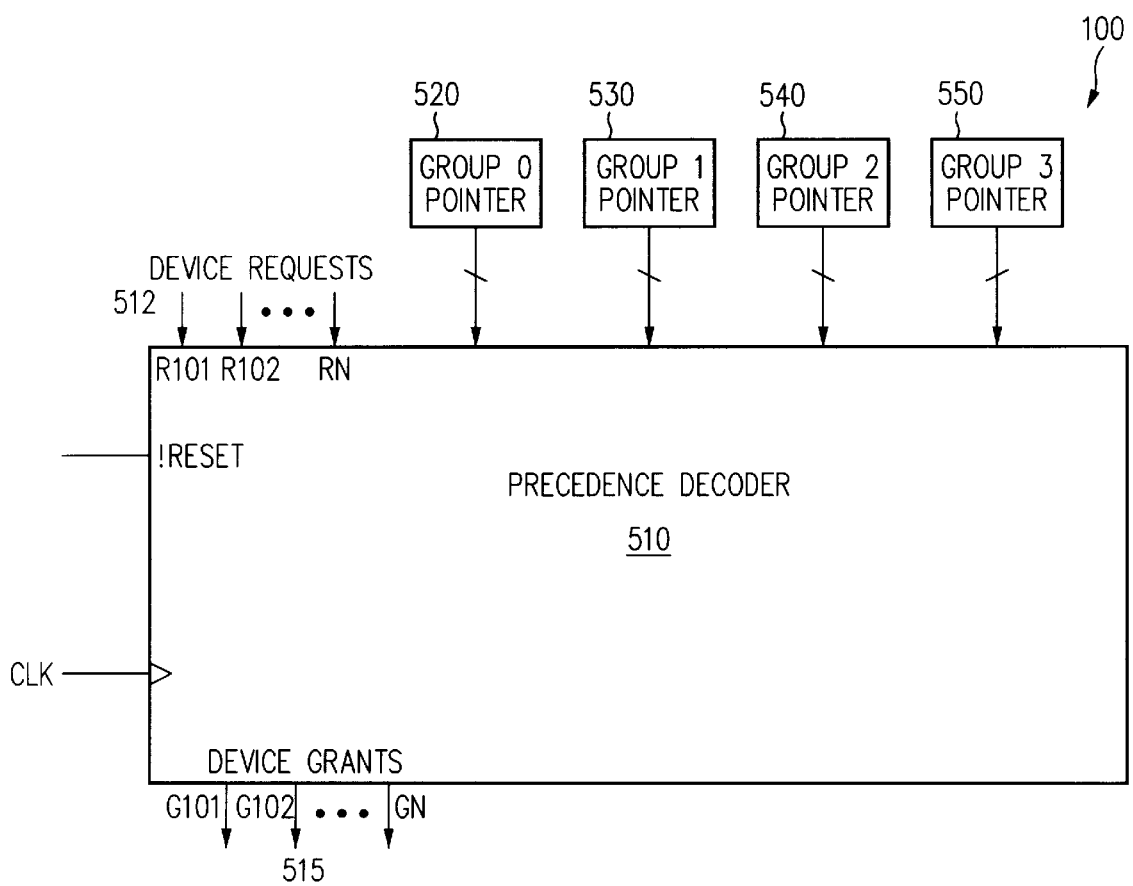
FIG. 5 shows a block diagram of an arbitration unit in accordance with a fifth embodiment of the invention.

FIG. 5 shows a block diagram of one embodiment of arbitration unit 100 (FIG. 1). Arbitration unit 100 includes a group pointer for each group in the arbitration scheme. Since, FIG. 5 is an illustrative example of arbitration unit 100 for the a bitration scheme of FIG. 2(a) with group 0 modified as shown in FIG. 3(a), arbitration unit 100 is shown with a group 0 pointer 520, a group 1 pointer 530, a group 2 pointer 540, and a group 3 pointer 550. Arbitration unit 100 also includes a precedence decoder 510. Precedence decoder 510 receives the device request signals from the request output terminals R of the various devices 101–109 (FIG. 1), a clock input signal CLK, a reset signal !RESET (!NAME for signal names refers to an active low signal called NAME), as well as the device ID (as explained below) of the highest-precedence requesting device in each group from group pointers 520, 530, 540, and 550. Precedence decoder 510 uses combinatorial logic to generate device grant signals on grant output terminals G1–GN for the various devices based on values from the group pointers and the request signals in accordance with the arbitration scheme explained above with respect to FIGS. 2(a)–4(b). Specifically, precedence decoder 510 grants the highest-precedence requesting device, i.e., the device with the highest precedence among all the devices in the system actually requesting access to shared device 120, access to shared device 120. Depending on the specific embodiment of the arbitration scheme other embodiments of arbitration unit 100 may include a different number of group pointers, request lines, and grant lines. Typically, if the reset signal !RESET is activated, all the grant output terminals of precedence decoder 510 are cleared.

Each device in a group is assigned a device identification (ID) number. Typically from zero to the number of devices minus 1 (device IDs are shown in binary herein). The group pointer contains the device ID of the device with the highest precedence as determined in the arbitration scheme explained above with respect to FIGS. 2(a)–4(b). For example, for group 1 (FIG. 2(a)), device 104 is assigned device ID 0 while group 2, treated as a single device in group 1 is assigned device ID 1. After device 104 is granted access to shared device 120, group 1 pointer 520 is set to 1 since group 2, treated as a single device in group 1, is given the highest precedence in group 1 as explained above. Similarly, after a device in group 2 or group 3 is granted access to shared device 120, group 1 pointer 530 is set to 0 since device 104 is given the highest precedence in group 1.

Similarly in group 0 (FIG. 3(a)), device 101 is assigned device ID 00, device 102 is assigned device ID 01, cluster 310 is assigned device ID 10, and group 1 is assigned device ID 11. After device 101 is granted access to device 120, group 0 pointer 520 is set to 01. After device 102 is granted access to shared device 120 based on the precedence of device 102 in group 0, group 0 pointer 520 is set to 10. After either device 103 is granted access to shared device 120 or device 102 is granted access to shared device 120 based on the precedence of cluster 310, group 0 pointer 520 is set to 11. After any device in group 1, group 2, or group 3 is given access to shared device 120, group 0 pointer 520 is set to 00. Group 2 pointer 540 and group 3 pointer 450 are set similarly. Typically, the group pointers are set to zero on power on or reset.

In the embodiment of FIG. 5, the group pointers do not provide the actual pointer value to precedence decoder 510. Instead, the group pointers provide the device ID of the group-highest-precedence requesting device, i.e., the device within the group with the highest precedence that is actually requesting access to shared device 120. Thus if cluster 310 has the highest precedence but only device 101 in group 0 is making a request for access to shared device 120, group 0 pointer 520 provides 00, i.e., the device ID assigned to device 101, to precedence decoder 510. Other embodiments of arbitration unit 510 may differ.

Figure 6:
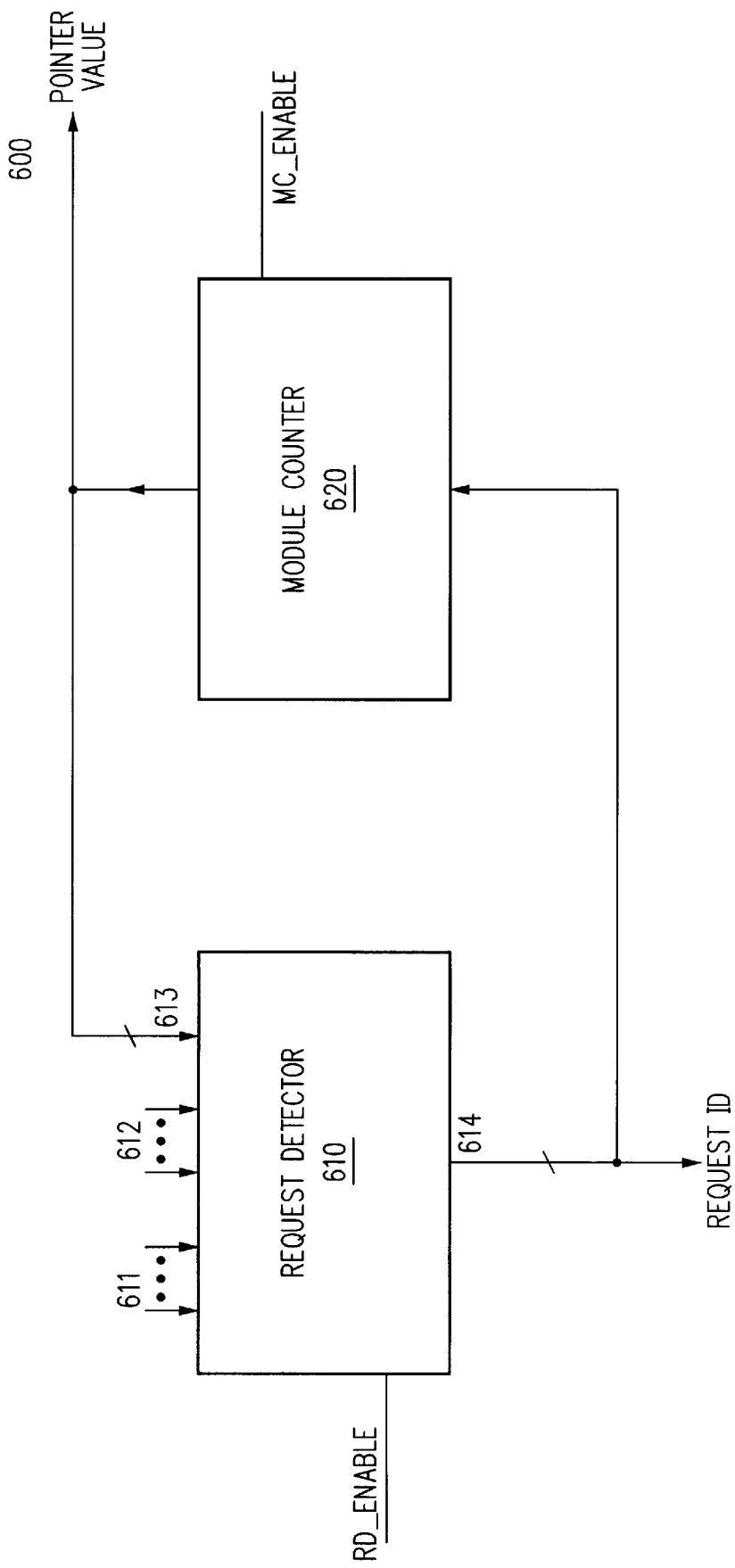
FIG. 6 shows a block diagram of a group pointer used in an arbitration unit in accordance to a sixth embodiment of the invention.

FIG. 6 illustrates one embodiment of a group pointer 600 for a group X (not shown). Group pointer 600 includes a request detector 610 coupled to a modulo counter 620. Request detector 610 determines the group X highest-precedence requesting device, i.e., the device with the highest precedence among group X devices which are requesting access to shared device 120. Modulo counter 620 contains the device ID of the highest-precedence device within group X. Request detector 610 receives a request signal from each device within group X on request input terminals 611. Request detector 610 also receives group request signals on group request input terminal 612.

Typically, the request signals of devices within a group are logically OR'ed together to form a group request signal to indicate that at least fine device in the group is making a request. For a first group containing a second group the group request signal of the first group would include the group request signal of the second group. For example to generate the group request signal of group 2 (FIG. 2(a)), the request signal from device 105, device 106, and the group 3 request signal would be logically OR'ed together. Therefore, the group 2 request signal is equivalent to the logical OR of the request signals from device 105, device 106, device 107, device 108, and device 109. Group grant signals are generated in a similar fashion from the individual device grant signals.

Since clusters function differently from groups, typically the request signals from devices or groups within a cluster are sent separately to request detector 610. Therefore, request detector 610 of group 0 pointer 520 (FIG. 3(a)) would receive the request signals of device 101, device 102, and device 103, as well as the group 1 request signal. However, some embodiments of group pointer 600 do not make use of group request signals. In these embodiments, request detector 610 would receive a request signal from each device within a group as well as each device in each subgroup. Thus, for example, an embodiment of request detector 610 of group 0 pointer 520 (FIG. 3(a) and FIG. 2(a)) would receive the request signals of devices 101–109.

The output of modulo counter 620, which indicates the device ID of the device within group X with the highest precedence, is also coupled to request detector 610 on device precedence input terminals 613. If enabled by enable signal RD_ENABLE, request detector 610 then generates the device ID of the group X highest-precedence requesting device. Typically, request detector 610 is enabled after a reset and after a device relinquishes shared device 120. Request detector 610 can be implemented using simple combinatorial logic. If group pointer 600 is in a synchronous system registered outputs are typically included in request detector 610.

For example, the combinatorial logic of request detector 610 for group 0 pointer 520 for group 0 as illustrated in FIG. 3(a) is defined in TABLE 1 where Rxxx represents a request from device xxx, RGx represents a request from group x, and GGx is a grant to group x. One skilled in the art can use logic design tools or Karnough maps to reduce TABLES 1–5 into combinatorial logic circuits. In the logic description of TABLES 1–5, logic 1 is used for both the grant active state and the request active state. Other embodiments may use logic 0 as the active state.

TABLE 1

Figure 2B:
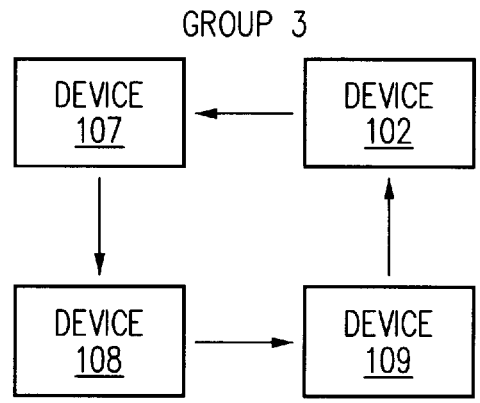

Request Detector Logic for Group 0 (FIG. 3 (a))
case (MC, i.e., the device ID number of the highest
    precedence device from modulo
    counter 620 in binary )
  00: If R101 then request ID=00;
    else if R102 then request ID=01;
      else if (R103 or R102) then
        request ID=10;
      else if RG1 then
        request ID=11;
  01: if R102 then request ID=01;
    else if (R103 or R102) then
      request ID=10;
    else if RG1 then request ID=11;
      else if R101 then
        request ID=00;
  10: if (R103 or R102) then request ID=10;
    else if RG1 then request ID=11;
      else if R101 then request ID=00;
        else if R102 then
        request ID=01;
  11: if RG1 then request ID=11;
    else if R101 then request ID=00;
      else if R102 then request ID=01;
        else if (R103 or R102) then
        request ID=10;

TABLE 2, TABLE 3, and TABLE 4 are logic descriptions for request detector 610 for group 1 (FIG. 2(a)), group 2 (FIG. 2(a)), and group 3 (FIG. 2(b)), respectively.

TABLE 2

Request Detector Logic for Group 1 (FIG. 2 (a))
case (MC, i.e., the device ID number of the highest
    precedence device from modulo
    counter 620 in binary )
  0: If R104 then request ID=0;
    else if RG2 then request ID=1;
  1: if RG2 then request ID=1;
    else if R104 then request ID=0;

TABLE 3

Request Detector Logic for Group 2 (FIG. 2 (a))
case (MC, i.e., the device ID number of the highest
    precedence device from modulo
    counter 620 in binary )
  00: If R105 then request ID=00;
    else if R106 then request ID=01;
      else if RG3 then request ID=10;
  01: if R106 then request ID=01;
    else if RG3 then request ID=10;
      else if R105 then request ID=00;
  10: if RG3 then request ID=10;
    else if R105 then request ID=00;
      else if R106 then request ID=01;

TABLE 4

Request Detector Logic for Group 3 (FIG. 2 (b))
case (MC, i.e., the device ID number of the highest
    precedence device from modulo
    counter 620 in binary )
  00: If R107 then request ID=00;
    else if R108 then request ID=01;
      else if R109 then request ID=10;
        else if R102 then TABLE 4-continued

```
              request ID=11;
    01: if R108 then request ID=01;
          else if R109 then request ID=10;
            else if R102 then request ID=11;
              else if R107 then
                  request ID=00;
    10: if R109 then request ID=10;
          else if R102 then request ID=11;
            else if R107 then request ID=00;
              else if R108 then
                  request ID=01;
    11: if R102 then request ID=11;
          else if R107 then request ID=00;
            else if R108 then request ID=01;
              else if R109 then
                  request ID=10;
```

When enabled by enable signal MC_ENABLE, modulo counter 620 stores the device ID from request detector 610 plus 1. If the result of the addition is equal to the number of devices in group X, modulo counter 620 stores zero. Enable signal MC ENABLE is active only if the group grant signal of group X is active, i.e., a device in group X or a device in a sub group of group X is granted access to shared device 120. Thus, modulo counter 620 contains the device ID of the device with the highest precedence in group X based on the arbitration scheme described above with respect to FIGS. 2(a)–4(b).

Precedence decoder 510 (FIG. 5) computes the grant signals based on the device ID of the requesting device with the highest precedence from the group pointers and the request signals from the devices. Each grant signal can be independently implemented with combinatorial logic based on the arbitration scheme described above with respect to FIGS. 2(a)–4(b). For synchronous systems, precedence decoder 510 uses registered outputs. TABLE 5 gives the logic description for each of the grant output terminals 515 for an embodiment of precedence decoder 510 to implement the arbitration scheme with group 0 of FIG. 3(a), group 1 and group 2 of FIG. 2(a), and group 3 of FIG. 2(b). In TABLE 5, Gxxx represents the grant output signal to device xxx, Rxxx represents the request signal from device xxx, IDx represents the device ID from the group x pointer. TABLE 5 uses "==" as a test of equality and "=" for assigning a value. In addition the notation "!Rxxx" represents "not Rxxx" so that !Rxxx evaluates to true if Rxxx is equal to 0.

TABLE 5

```
              Precedence decoder logic
    IF (!RESET and ID0==00 and R101) THEN G101=1
    ELSE G101=0;
    IF (!RESET and ((ID0==01 and R102)
        or (ID0==10 and !R103 and R102)
        or (ID0==11 and ID1==1 and ID2==10 and
            ID4==11 and R102))
        THEN G102=1;
    ELSE G102=0;
    IF (!RESET and ID0==10 and R103) then G103=1
    ELSE G103=0;
    IF (!RESET and ID0==11 and ID1==0 and R104)
        then G104=1
    ELSE G104=0;
    IF (!RESET and ID0==11 and ID1==1 and ID2==00
        and R105)
```

TABLE 5-continued

```
        then G105=1
    ELSE G105=0;
    IF (!RESET and ID0==11 and ID1==1 and ID2==01
        and R106)
        then G106=1
    ELSE G106=0;
    IF (!RESET and ID0==11 and ID1==1 and ID2==10
        and ID4==00 and R107)
        then G107=1
    ELSE G107=0;
    IF (!RESET and ID0==11 and ID1==1 and ID2==10
        and ID4==01 and R108)
        then G108=1
    ELSE G108=0;
    IF (!RESET and ID0==11 and ID1==1 and ID2==10
        and ID4==10 and R109)
        then G109=1
    ELSE G109=0;
```

An implementation of one embodiment of arbitration unit 100 using verilog code is included in Appendix A. Specifically, the implementation of Appendix A arbitrates access to a shared memory buffer and a memory controller in a CD-ROM drive. The devices requiring access to the shared memory buffer include a host computer system, an error correcting/detecting circuit, a digital signal processor, a digital to analog converter, refresh circuitry, a microcontroller, and a digital signal processor, which stores and retrieves primary data, secondary error correction data, general subcode data, subcode channel Q data, and serial digital audio data.

Thus by using the arbitration scheme according to the principles of the invention, an arbitration unit can efficiently control access to a shared device. Specifically, the arbitration unit is able to satisfy both the minimum access to the shared device requirement and the maximum latency to access the shared device of the other devices.

The various embodiments of the structure and method of this invention that are described above are illustrative only of the principles of this invention and are not intended to limit the scope of the invention to the particular embodiments described. In view of this disclosure, those skilled-in-the-art can define other devices, shared devices, arbitration units, group pointers, precedence decoders, request detectors, request mechanisms, groupings, clustering, group hierarchies, and use these alternative features to create a method or system of arbitration according to the principles of this invention.

We claim:

1. A method for arbitrating access to a shared device among a plurality of devices, said method comprising:

assigning a precedence to each of said plurality of devices to form a hierarchy of precedences in said plurality of devices;

using said precedence of a first device of said plurality of devices in place of said precedence of a second device of said plurality of devices if said first device is not requesting access to said shared device and said precedence of said first device is greater than said precedence of said second device; and granting a highest-precedence requesting device access to said shared device, wherein said second device is capable of gaining access to said shared device before other devices of said plurality of devices with higher precedence than said second device but with less precedence than said first device.

2. The method of claim 1, wherein said each of said precedences is unique.

3. The method of claim 1, preceded by circularly ordering said plurality of devices and wherein said assigning a precedence to each of said plurality of devices to form a hierarchy of precedences in said plurality of devices is performed circularly with decreasing precedence.

4. The method of claim 3, wherein said hierarchy of precedence contains a highest precedence and a lowest precedence.

5. The method of claim 4, further comprising:

designating a lowest-precedence device by assigning said lowest-precedence to said highest-precedence requesting device unless said highest-precedence requesting device is said second device and said precedence of said first device is greater than said precedence of said second device; and designating said lowest-precedence device by assigning said lowest-precedence to said first device if said highest-precedence requesting device is said second device and said precedence of said first device is greater than said precedence of said second device.

6. The method of claim 5, further comprising assigning said highest precedence to a device circularly ordered after said lowest-precedence device.

7. The method of claim 4, further comprising using said precedence of said second device in place of said precedence of said first device if said first device is requesting access to said shared device and said precedence of said second device is greater than said precedence of said first device.

8. The method of claim 7, further comprising:

designating a lowest-precedence device by assigning said lowest-precedence to said highest-precedence requesting device unless said highest-precedence requesting device is said second device and said precedence of said first device is greater than said precedence of said second device; and designating said lowest-precedence device by assigning said lowest-precedence to said first device if said highest-precedence requesting device is said second device and said precedence of said first device is greater than said precedence of said second device.

9. The method of claim 8, further comprising assigning said highest precedence to a device circularly ordered after said lowest-precedence device.

10. The method of claim 4 further comprising:

detecting an incomplete access caused by a limitation of said shared device;

maintaining said hierarchy of precedences if said incomplete access caused by said limitation of said shared device is detected; and reassigning said hierarchy of precedences if said incomplete access caused by said limitation of said shared device is not detected.

11. The method of claim 10, wherein said assigning said hierarchy of precedences if said incomplete access caused by said limitation of said shared device is not detected comprises:

designating a lowest-precedence device by assigning said lowest-precedence to said highest-precedence requesting device unless said highest-precedence requesting device is said second device and said precedence of said first device is greater than said precedence of said second device; and designating said lowest-precedence device by assigning said lowest precedence to said first device if said highest-precedence requesting device is said second device and said precedence of said first device is greater than said precedence of said second device.

12. A method for arbitrating access to a shared device among a plurality of devices, said method comprising:

assigning a precedence to each of said plurality of devices to form a hierarchy of precedences in said plurality of devices;

using said precedence of a first device of said plurality of devices in place of said precedence of a second device of said plurality of devices if said first device is not requesting access to said shared device and said precedence of said first device is greater than said precedence of said second device;

granting a highest-precedence requesting device access to said shared device;

detecting an incomplete access caused by a limitation of said shared device;

maintaining said hierarchy of precedences if said incomplete access caused by said limitation of said shared device is detected; and reassigning said precedence of each device if said incomplete access caused by said limitation of said shared device is not detected, wherein said second device is capable of gaining access to said shared device before other devices of said plurality of devices with higher precedence than said second device but with less precedence than said first device.

13. The method of claim 12, wherein said reassigning said hierarchy of precedences if said incomplete access caused by said limitation of said shared device is not detected comprises:

designating a lowest-precedence device by assigning said lowest-precedence to said highest-precedence requesting device unless said highest-precedence requesting device is said second device and said precedence of said first device is greater than said precedence of said second device; and designating said lowest-precedence device by assigning said lowest precedence to said first device if said highest-precedence requesting device is said second device and said precedence of said first device is greater than said precedence of said second device.

14. An arbitration unit for arbitrating access to a shared device among a plurality of devices, said arbitration unit comprising:

means for assigning a precedence to each of said plurality of devices to form a hierarchy of precedences in said plurality of devices;

means for using said precedence of a first device of said plurality of devices in place of said precedence of a second device of said plurality of devices if said first device is not requesting access to said shared device and said precedence of said first device is greater than said precedence of said second device; and means for granting a highest-precedence requesting device access to said shared device;

wherein said second device is capable of gaining access to said shared device before other devices of said plurality of devices with higher precedence than said second device but with less precedence than said first device.

15. The arbitration unit of claim 14, wherein said each of said precedences is unique.

16. The arbitration unit of claim 14, further comprising means for circularly ordering said plurality of devices and wherein said assigning a precedence to each of said plurality of devices to form a hierarchy of precedences in said plurality of devices is performed circularly with decreasing precedence.

17. The arbitration unit of claim 16, wherein said hierarchy of precedence contains a highest precedence and a lowest precedence.

18. The arbitration unit of claim 17, further comprising:

means for designating a lowest-precedence device by assigning said lowest-precedence to said highest-precedence requesting device unless said highest-precedence requesting device is said second device and said precedence of said first device is greater than said precedence of said second device; and means for designating said lowest-precedence device by assigning said lowest-precedence to said first device if said highest-precedence requesting device is said second device and said precedence of said first device is greater than said precedence of said second device.

19. The arbitration unit of claim 18, further comprising means for assigning said highest precedence to a device circularly ordered after said lowest-precedence device.

20. The arbitration unit of claim 17, further comprising means for using said precedence of said second device in place of said precedence of said first device if said first device is requesting access to said shared device and said precedence of said second device is greater than said precedence of said first device.

21. The arbitration unit of claim 20, further comprising:

means for designating a lowest-precedence device by assigning said lowest-precedence to said highest-precedence requesting device unless said highest-precedence requesting device is said second device and said precedence of said first device is greater than said precedence of said second device; and means for designating said lowest-precedence device by assigning said lowest-precedence to said first device if said highest-precedence requesting device is said second device and said precedence of said first device is greater than said precedence of said second device.

* * * * *